(12) United States Patent
Winick et al.

(10) Patent No.: US 6,462,434 B1
(45) Date of Patent: Oct. 8, 2002

(54) POWER SUPPLY ISOLATION CIRCUIT AND METHOD

(75) Inventors: Bradley D. Winick, Fort Collins; Robert B. Smith, Loveland, both of CO (US)

(73) Assignee: Hewlett-Packard Company, Palo Alto, CA (US)

(*) Notice: Subject to any disclaimer, the term of this patent is extended or adjusted under 35 U.S.C. 154(b) by 17 days.

(21) Appl. No.: 09/738,829

(22) Filed: Dec. 15, 2000

(51) Int. Cl.7 .................................................. H02J 1/04
(52) U.S. Cl. .......................................... 307/85; 307/87
(58) Field of Search .......................... 307/52–63, 85–87

(56) References Cited

U.S. PATENT DOCUMENTS

| | | | | |
|---|---|---|---|---|
| 4,812,672 A | * | 3/1989 | Cowan et al. ................ | 307/85 |
| 5,598,041 A | * | 1/1997 | Willis ........................... | 307/85 |
| 5,672,958 A | * | 9/1997 | Brown et al. ................. | 307/53 |
| 5,945,816 A | * | 8/1999 | Marusik ....................... | 307/86 |

* cited by examiner

Primary Examiner—Fritz Fleming

(57) ABSTRACT

A power system has a first power supply operatively connect in parallel to a second power supply. The output of the first power supply is connected to the input of a switching device, such as a mosfet. The output of the switching device is the output of the power system. A measuring device, such as a differential amplifier measures the polarity between the input and output of the switching device. A controller connected to the switching device permits the switching device to conduct current if a first polarity is present between the input and the output. The controller interrupts current flow if a second polarity is present between the input and the output.

24 Claims, 2 Drawing Sheets

POWER SUPPLY ISOLATION CIRCUIT AND METHOD

TECHNICAL FIELD OF THE INVENTION

The present invention relates to power supplies connected in parallel and, more particularly, to power supplies connected in parallel by the use of mosfets wherein the mosfets are used to monitor the current output of the power supplies and to isolate the power supplies from each other.

BACKGROUND OF THE INVENTION

Many electronic devices, such as computers, have high power requirements at relatively low voltages. Accordingly, the power supplies associated with these devices are required to output relatively high current in order to meet the high power requirements. In order to achieve the high current requirements, the outputs of several power supplies are typically connected to each other in parallel. This parallel connection of the power supplies allows their current outputs to be summed and provides for redundancy. Accordingly, if one power supply fails, the system to which power is being supplied will be powered by the other supplies and will not fail.

The output of each power supply is typically connected to an electronic device or component that serves to isolate the power supplies from each other. For example, diodes may be connected between the outputs of the power supplies and the electronic device. When the power supplies are active, the diodes conduct current from the power supplies to the electronic device. In the event that one of the power supplies becomes inactive, the diodes associated with the inactive power supply ceases to conduct current. Accordingly, the inactive power supply is isolated and prevented from drawing current from the remaining active power supplies. The above-described isolation also prevents the voltage output of the remaining combination of power supplies from dropping due to the load of an inactive power supply.

In order to conduct the high current supplied by a power supply, the output of the power supply may have to be connected to several diodes that are connected in parallel. These diodes dissipate large quantities of heat when they conduct current, which requires provisions to convect the heat away from the diodes and other electronic components located in the vicinity of the diodes. For example, heat sinks may be physically attached to the diodes to convect heat from the diodes. In another example, the diodes may be mounted to a printed circuit board that has large amounts of copper in the area of the diodes to convect the heat away from the diodes.

In addition to the heat problem, the plurality of diodes occupies a large amount of area of a printed circuit board, which presents at least two problems. First, as electronic devices become more complex and smaller, the areas of their printed circuit boards are required to be small and to be occupied by as many components as is physically possible. The plurality of diodes and their associated convection devices occupy valuable area on the printed circuit board that could otherwise be occupied by electronic components. The second problem is that the large area of the printed circuit board occupied by the diodes will become excessively hot due to the number of heat dissipating diodes located in close proximity. As the printed circuit boards become denser with more electronic components, the electronic components in the proximity of the diodes and may be adversely affected by the excessive heat generated by the diodes. Accordingly, the excessive heat may adversely affect the operation of the electronic device as a whole.

Yet another problem with using diodes for isolation purposes is that their forward voltage drops are high relative to a low voltage power supply. For example, a schottky silicon diode typically has a forward voltage drop of about 0.4 volts. Therefore, a typical processing circuit requiring 3.3 volts is required to be powered by power supplies that output 3.7 volts in order to overcome the forward voltage drops of the diodes. In addition, the power supplies have to output more power in order to overcome the power dissipated by the diodes as a result of the forward voltage drops of the diodes.

A need exists for a power supply system that overcomes some or all of these problems.

SUMMARY OF THE INVENTION

The present invention is directed toward a power system comprising at least two power supplies operatively connected in parallel. The output of each power supply may be connected to an input of a switching device. The outputs of the switching devices may be connected together to provide the output of the power system. The switching devices may have controls, such as electrical inputs, that control the current flow between the inputs and the outputs. The switching devices may, as an example, be n-channel mosfets wherein the sources are connected to their respective power supplies, the drains are connected to the output of the power system, and the controls are the gates.

A voltage measuring device, such as a differential amplifier, may be connected across the input and the output of each switching device so as to measure the voltage drop across each switching device. The voltage measuring device may output a signal representative of this voltage drop. The signal may, as an example, be indicative of the polarity of the voltage drop between the input and the output of the switching device. The output of the voltage measuring device may be connected to the input of a comparator. The output of the comparator may be connected to the control of the switching device so as to control the current flow through the switching device.

When a power supply is active, the voltage at the input of its associated switching device is higher than the voltage at the output of its associated switching device. The voltage measuring device measures this difference and outputs a signal representative of this difference to the comparator. If the output of the voltage measuring device is greater than a preselected value, the comparator outputs a signal to the control of the switching device that causes the switching device to conduct current. The power supply is then operatively connected to the remaining power supplies and the output of the power system.

If a power supply becomes inactive, its output drops to zero volts. Accordingly, the polarity of the voltage drop across its associated switching device will change, which is measured by the voltage measuring device. The voltage measuring device outputs a signal to the comparator that is indicative of the reversed polarity. The signal will not be greater than the preselected value, so the comparator will output a signal to the switching device causing it to cease conducting current. The inactive power supply is, thus, isolated from the remaining active power supplies. In one example, the switching device is a mosfet, wherein the intrinsic body diode of the mosfet serves to isolate the inactive power supply from the remaining active power supplies.

Detailed Description of the Invention

Figure 1:
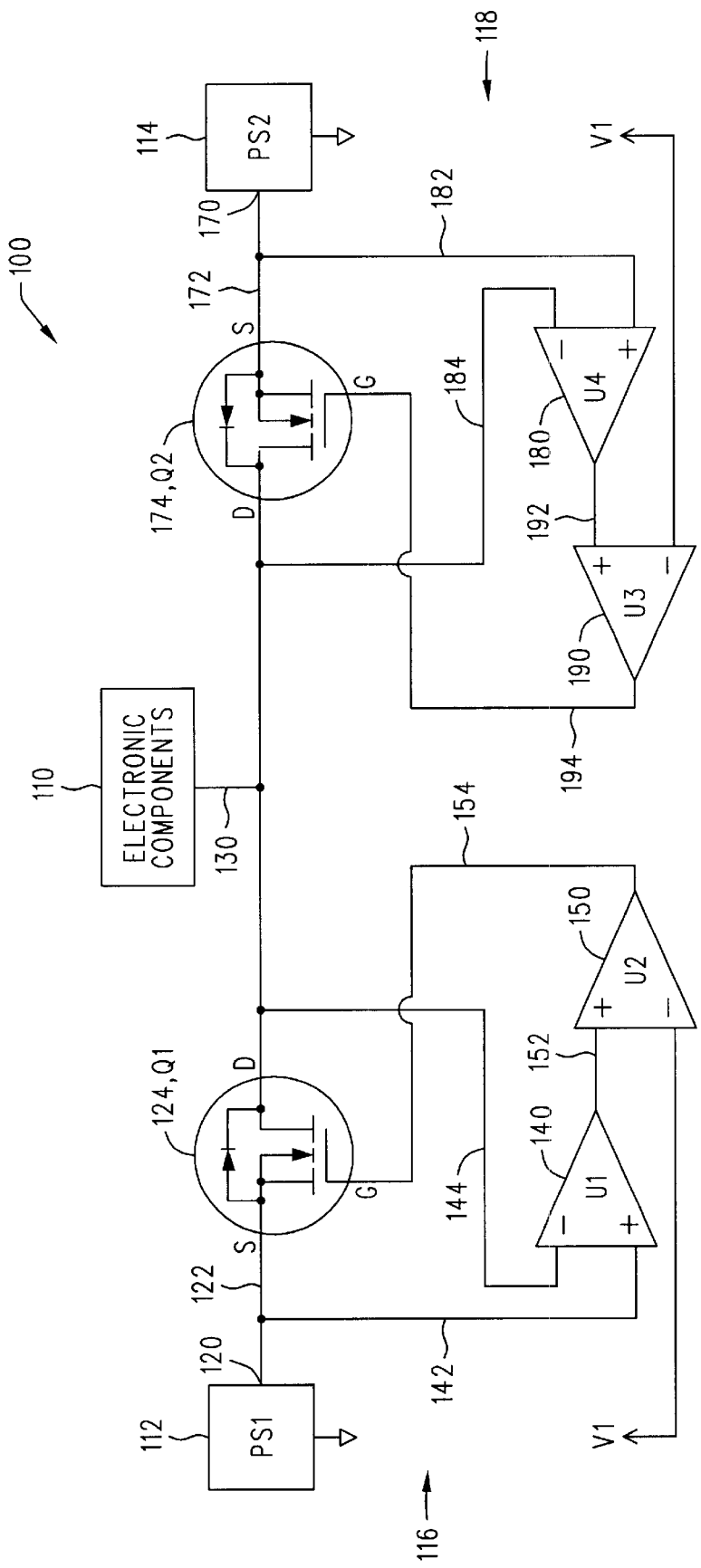
FIG. 1 is a schematic block diagram of a power supply circuit.
Figure 2:
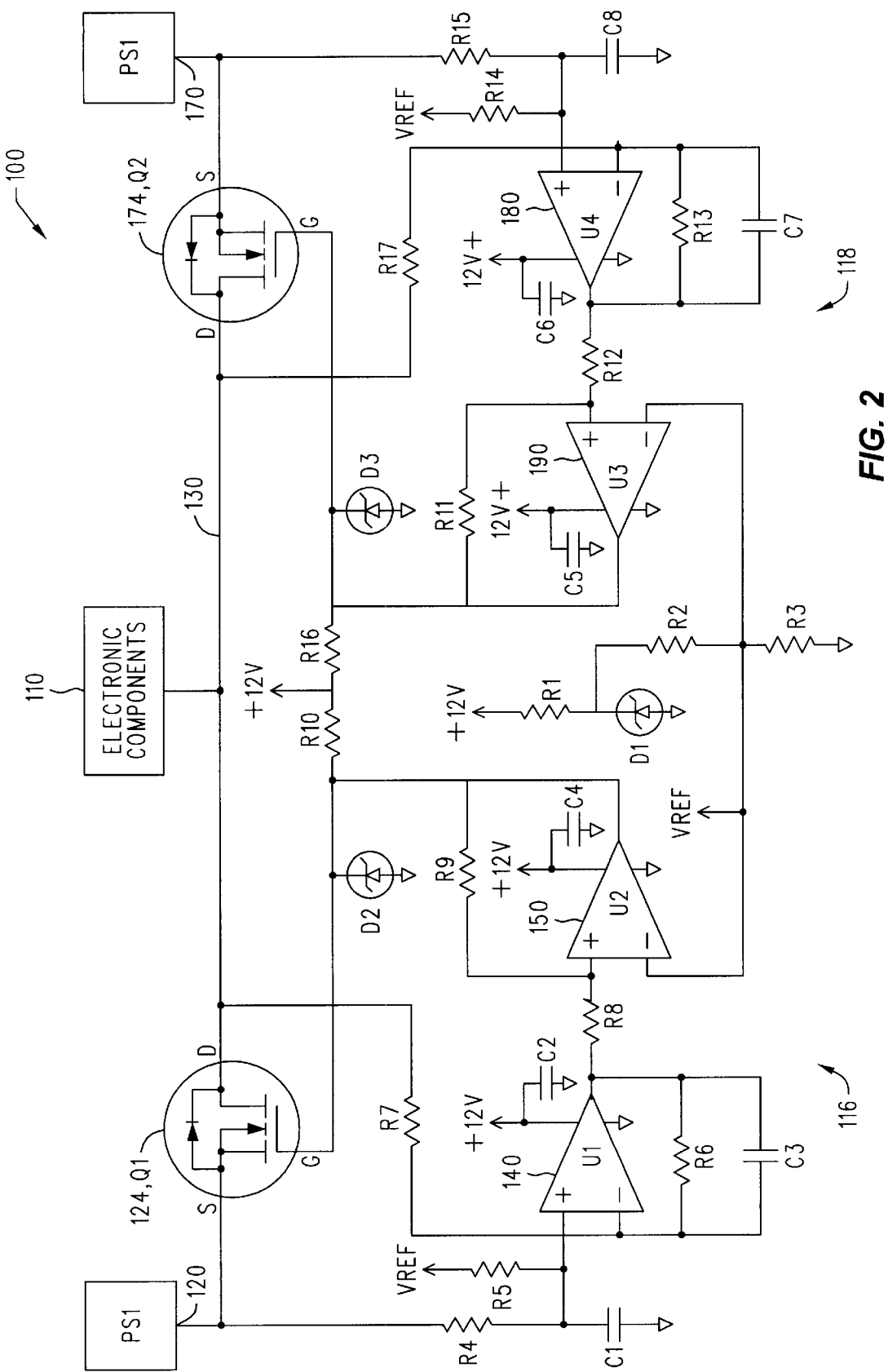
FIG. 2 is a detailed schematic circuit diagram of the power supply circuit of FIG. 1.

FIGS. 1 and 2, in general, describe a power supply system 100 that may include a first power supply 112 having an output 120 and a second power supply having an output 170. The power supply system 100 may also include a first switching device 124 (sometimes referred to as the first mosfet). The first switching device 124 may have a first switching device input (source), a first switching device output (drain), and a first switching device control (gate). The input of the first switching device may be electrically connected to the output 120 of the first power supply 112. The output of the first switching device 124 may be operatively connected to the output 170 of the second power supply 114. A first voltage measuring device 140 operatively connected between the input of the first switching device 124 and the output of the first switching device 124. The first voltage measuring device 140 may have an output adapted to output a signal that is representative of the difference between the input and the output of the first switching device 124. The output of the first voltage measuring device 140 is operatively connected to the control of the first switching device 124.

FIGS. 1 and 2 also, in general illustrate a power supply system 100 that may include a first power supply 112 having an output 120 and a second power supply having an output 170. The power supply system 100 may also include a first mosfet 124, wherein the source of the first mosfet 124 is operatively connected to the output 120 of the first power supply 112 and the drain of the first mosfet 124 is operatively connected to the output 170 second power supply 120. A first voltage measuring device 140 may be operatively connected between the source and the drain of the first mosfet 124. The first voltage measuring device 140 may have an output adapted to generate a signal representative of the voltage difference between the source and the drain of the first mosfet 124. A first voltage comparator 150 having an input and an output may be operatively connected to the output of the measuring device 140. The output of the comparator 150 may be operatively connected to the gate of the first mosfet 124.

FIGS. 1 and 2 also, in general, illustrate a method for isolating a first power supply 112 from a second power supply 114. The method may include providing a first switching device 124 having an input, an output, and a control. The input of the first switching device 124 may be connected to the output of the first power supply output. The output of the first switching device 124 may be operatively connected to the output of the second power supply 114. The voltage difference between the input and output of the first switching device may be measured. Current may conduct through the first switching device 124 when the voltage difference is greater than a preselected value. The current flow through the first switching device 124 may be interrupted when the voltage difference is not greater than the preselected value.

Having generally described the power supply circuit 100, it will now be described in greater detail. A simplified block diagram of the power supply circuit 100 is illustrated in FIG. 1. A more detailed circuit schematic diagram of a non-limiting example of the power supply circuit 100 will be described further below.

The power supply circuit 100 serves to provide electric power to electronic components 110. The power supply circuit 100 may have, among other components, a first power supply 112 (sometimes referred to as PS1) and a second power supply 114 (sometimes referred to as PS2). As described in greater detail below, the outputs of the first power supply 112 and the second power supply 114 are operatively connected together in parallel to supply their summed electric power to the electronic components 110. The operative connection, as described below, also serves to isolate the first power supply 112 and the second power supply 114 from each other. Therefore, the failure or other deactivation of one power supply does not cause it to draw current, and thus power, from the other power supply and the electronic components 110. The isolation of the first power supply 112 is provided by a first monitoring circuit 116 and the isolation of the second power supply 114 is provided by a second monitoring circuit 118.

The first power supply 112 in combination with the first monitoring circuit 116 will be described followed by a description of the second power supply 114 in combination with the second monitoring circuit 118. The first power supply 112 may have an output 120. The output 120 may, as a non-limiting example, provide 3.3 volts at a maximum current of twenty amperes for a maximum power output of sixty-six watts. The first power supply 112 may, as a non-limiting example, be of the type commercially available from Artesyn Technologies as model NXA66. The output 120 may be connected to a line 122 which in turn may be connected to the source of a first mosfet 124 (sometimes referred to as Q1). The first mosfet 124 may, as an example, be a power n-channel mosfet having very low drain to source on resistance, e.g., four milliohms. The first mosfet 124 may, as a non-limiting example, be of the type commercially available from the International Rectifier Company of El Segundo, Calif. and corresponding to the specifications IRLBL1304.

The drain to source current in the first mosfet 124 is switchable between an on mode and an off mode by application of a bias voltage on the gate. The above-described resistance between the drain and the source is present when the first mosfet 124 is in the on mode. When current flows from the source to the drain, a voltage corresponding to the current flow is generated between the source and the drain. As will be described in greater detail below, this voltage is used to determine the current flow, including the direction of current flow, through the first mosfet 124. As is known in the art, a mosfet has an intrinsic body diode acting between the source and the drain wherein the anode of the diode is connected to the source and the cathode is connected to the drain. As will be described in greater detail below, this intrinsic body diode serves to isolate the first power supply 112 from other components in the power supply circuit 100 in the event the first power supply 112 becomes inactive.

A first differential amplifier 140 (sometimes referred to as U1) may be electrically connected between the source and the drain of the first mosfet 124 by lines 142 and 144 respectively. It should be noted that other components, not shown in FIG. 1, may be associated with the first differential amplifier 140. The first differential amplifier 140 may serve to measure the voltage drop between the source and the drain of the first mosfet 124. It is to be understood that the use of a differential amplifier to measure a voltage is for illustration purposes only and that other voltage measuring devices may be used to measure the voltage drop between the source and the drain of the first mosfet 124. The output of the first differential amplifier 140 may be electrically connected to a first voltage comparator 150 (sometimes referred to as U2) by way of a line 152. The first voltage comparator 150 may serve to compare the output of the first differential amplifier 140 to a preselected voltage, V1. The output of the first voltage comparator 150 is electrically connected to the gate of the first mosfet 124 by way of a line 154. It should be noted that other electronic components, not shown in FIG. 1, may be associated with the first voltage comparator 150.

Having described the first power supply 112 in combination with the first monitoring circuit 116, the second power supply 114 in combination with the second monitoring circuit 118 will now be described.

It should be noted that the second power supply 114 in combination with the second monitoring circuit 118 is virtually identical to the first power supply 112 in combination with the first monitoring circuit 116. The second power supply 114 may be identical to the first power supply 112 and may have an output 170. The output 170 may, as a non-limiting example, provide 3.3 volts at a maximum current of twenty amperes for an output power of sixty-six watts. A line 172 may connect the output 170 of the second power supply 114 to the source of a second mosfet 174 (sometimes referred to as Q2). The second mosfet 174 may, as an example, be a power n-channel mosfet having very low drain to source on resistance and may be identical to the first mosfet 124.

A second differential amplifier 180 (sometimes referred to as U4) may be electrically connected between the source and the drain of the second mosfet 174 by way of lines 182 and 184 respectively. The second differential amplifier 180 may serve to measure the voltage drop between the source and the drain of the second mosfet 174. It is to be understood that the use of the second differential amplifier 180 is for illustration purposes only and that other voltage measuring devices may be used to measure the voltage drop between the source and the drain of the second mosfet 174. It is also to be understood that other components, not shown in FIG. 1, may be associated with the second differential amplifier 180. The output of the second differential amplifier 180 may be electrically connected to a second voltage comparator 190 (sometimes referred to as U3) by way of a line 192. The second voltage comparator 190 may serve to compare the output of the second differential amplifier 180 to the preselected voltage, V1. The output of the second voltage comparator 190 is electrically connected to the gate of the second mosfet 174 by way of a line 194. It is to be understood that other electronic components, not shown in FIG. 1, may be associated with the second voltage comparator 190.

As shown in FIG. 1, the drains of the first mosfet 124 and the second mosfet 174 are electrically connected together to form a line 130. The line 130 in the non-limiting embodiment illustrated herein is used to provide electric power to the electronic components 110. Accordingly, the electronic components 110 are supplied power equal to the sum of the power outputs of both the first power supply 112 and the second power supply 114.

Having described the components of the power supply circuit 100, the operation of the power supply circuit 100 will now be described.

The objective of the power supply circuit 100 is to supply electric power and, thus current, to the electronic components 110. The electronic components 110 may require more current than a single power supply is capable of supplying. Therefore, several power supplies are connected in parallel to provide the necessary current. Likewise, the power supply circuit 100 may provide redundancy by having a plurality of power supplies connected in parallel. Accordingly, if one power supply fails, another power supply will be able to supply power to the electronic components 110. In the non-limiting embodiment described herein, two power supplies, the first power supply 112 and the second power supply 114, are operatively connected in parallel to supply current to the electronic components 110. It is to be understood, however, that any number of power supplies may be connected in parallel to supply current to the electronic components 110. It is also to be understood that only the power supplies that are required to be isolated from the other components of the power supply circuit 100 need to have monitoring circuits associated with them.

As described above, both the first power supply 112 and the second power supply 114 output electric current to provide power for the electronic components 110. In the non-limiting embodiment described herein, both power supplies 112, 114 output 3.3 volts at a maximum current of twenty amperes for a maximum power of sixty-six watts each. The operation of the first power supply 112 in association with the first monitoring circuit 116 will be described followed by a brief description of the operation of the second power supply 114 in association with the second monitoring circuit 118. It should be noted that the first monitoring circuit 116 and the second monitoring circuit 118 are virtually identical to each other. More detailed descriptions of the operation of the power supply circuit 100 are provided further below.

Assuming that the first mosfet 124 is initially off and the second power supply 114 is initially active, zero volts will be present at the drain of the first mosfet 124. Accordingly zero volts will be present at the inverting input of the first differential amplifier 140. The source of the first mosfet 124 will have a voltage of 3.3 volts, which will be present on the non-inverting input to the first differential amplifier 140. These inputs to the first differential amplifier 140 will cause it to output a positive voltage, which is preselected to be greater than the voltage, V1. The output voltage of the first differential amplifier 140 is present on the non-inverting input of the first voltage comparator 150. Because the voltage on the non-inverting input of the first voltage comparator 150 is greater than the voltage on the inverting input of the first voltage comparator 150, the first voltage comparator 150 outputs a high voltage on the line 154. The high voltage is, thus, present on the gate of the first mosfet 124, which turns the first mosfet 124 on. The first mosfet 124 then conducts current.

When the first mosfet 124 turns on, current flows from the drain to the source. The first mosfet 124 has a very low drain to source resistance when it is on, which will generate a voltage corresponding to the current passing through it. The low resistance generates a low voltage; however, the low resistance allows high current to pass through the first mosfet 124 without it dissipating a large amount of energy. When the first mosfet 124 is on, the voltage at the source is slightly higher than the voltage at the drain, meaning that current is flowing from the first power supply 112 to the electronic components 110. The gain of the first differential amplifier 140 is preselected so that it is able to measure the small voltage difference between the source and the drain of the first mosfet 124. The gain of the first differential amplifier 140 is also high enough to cause the output of the first differential amplifier 140 to be greater than the voltage V1 when a slight voltage difference between the source and the drain of the first mosfet 124 is measured. Accordingly, the first voltage comparator 150 will continue to output a high voltage to the gate of the first mosfet 124, which keeps the first mosfet 124 on.

The second power supply 114 in conjunction with the second monitoring circuit 118 functions in the same manner as the first power supply 110 in conjunction with the second monitoring circuit 118. When both the first power supply 110 and the second power supply 114 are active, the electronic components 110 are able to draw current from both of them. It should be noted that any number of power supplies and monitoring circuits may be electrically connected in parallel to the line 130 to increase the current supplied to the electronic components 110. It should also be noted that it is preferred that the power supplies have current sharing or have their references connected together. As can be seen with reference to FIG. 1, under light load conditions, only one of the mosfets may turn on. Under large load conditions, both mosfets may turn on.

In a conventional power system having multiple power supplies, the failure of a single power supply could cause the entire power system to fail. This is in part due to the individual power supplies having low output resistances. Therefore, when one power supply fails, its output voltage drops to zero, causing it to sink current from the remaining active power supplies. This combination of low voltage and current sinking acting on the power system as a whole causes the voltage of the power system to drop and the current output from the power system to be drawn into the power supply that failed. Accordingly, the power that is able to be supplied to electronic components is significantly diminished.

As described below, the power supply circuit 100 described herein will not fail upon the failure of a single power supply. The following description describes the failure or inactivation of the first power supply 112. Upon the failure or inactivation of the first power supply 112, its output voltage drops to zero and current flows or attempts to flow into the first power supply 112. Accordingly, current attempts to flow from the drain to the source in the first mosfet 124, which switches the polarity of the first mosfet 124 so that the drain is at a higher voltage than the source. It should be noted that the monitoring circuit 116 described herein is typically able to turn the first mosfet 124 off before any significant current can flow from the drain to the source. With regard to the first differential amplifier 140, the reversed polarity on the first mosfet 124 causes the inverting input to be at a higher voltage than the non-inverting input. Thus, the first differential amplifier 140 outputs a low voltage wherein the low voltage is not enough to cause the first voltage comparator 150 to output a high voltage as is described in detail below.

The low voltage output from the first differential amplifier 140 causes the first voltage comparator 150 to output a low voltage to the gate of the first mosfet 124. This low voltage on the gate causes the first mosfet 124 to turn off. The intrinsic body diode within the first mosfet 124 then acts to stop the current flow through the first mosfet 124, which isolates the first power supply 112 from other components within the power supply circuit 100. The first mosfet 124 will remain off until the source is at a higher voltage than the drain, which is indicative of the first power supply 112 becoming active. As described in greater detail below, the first voltage comparator 150 may have hysteresis built therein in order to prevent the first mosfet 124 from repeatedly turning on and off during the transition between the off state and the on state.

In the event that the electronic components 110 draw excessive current, the first mosfet 124 will remain on. For example, if a short circuit occurs in the electronic components 110 or if other power supplies within the power supply circuit 100 fail, the first power supply 112 will be forced to output high current. Because the first mosfet 124 remains on, the mosfet, not the intrinsic body diode, will dissipate the heat generated by the high current flow through the first mosfet 124. This alleviates any damage that may occur to the intrinsic body diode due to high current passing through the first mosfet 124. Because the resistance between the drain and source is very low, the excessive current will not cause the first mosfet 124 to dissipate an overly excessive amount of heat. Therefore, no extravagant convection methods or devices are required to cool the first mosfet 124. It should be noted that the second mosfet 174 will operate in a manner similar to the first mosfet 124 when the electronic components draw excessive current.

Having described a simplified embodiment of the power supply circuit 100 based on the simplified diagram of FIG. 1, a more detailed embodiment of the power supply circuit 100 will now be described.

A detailed schematic illustration of a non-limiting embodiment of the power supply circuit 100 is illustrated in FIG. 2. The values of the components of the electric circuit of FIG. 2 are shown in Table 1.

TABLE 1

| Element | Type, Value or Rating |
|---|---|
| C1, C3, C7, C8 | 10 pf |
| C2, C4, C5, C6 | 0.1 uf |
| D1 | 2.4 volt zener |
| D2, D3 | 12 volt zener |
| PS1, PS2 | 3.3 volts |
| Q1, Q2 | IRLBL1304 mosfet |
| R1 | 1.25 k |
| R2 | 10 k |
| R3 | 2.49 k |
| R4, R7, R8, R12, R15, R17 | 1 k |
| R5, R6, R13, R14 | 100 k |
| R9, R11 | 511 k |
| R10, R16 | 1.25 k |
| U1, U4 | LM358 |
| U2, U3 | LM393 |

A voltage VREF is established which is similar to the voltage V1 described above. The voltage VREF is established in the power supply circuit 100 of FIG. 2 by the use of a twelve volt power supply, a zener diode D1 and three resistors, R1, R2, and R3. The zener diode D1 may, as a non-limiting example, be a 2.4 volt zener diode. Per the values of the resistors listed in Table 1, a voltage VREF is set at approximately 0.46 volts when the power supplies are inactive and approximately 0.59 volts when the power supplies are active. It should be noted that the value of the voltage VREF may differ depending on the application of the power supply circuit 100 and other components used within the power supply circuit 100.

A resistor R4 is connected between the output 120 of the first power supply PS1 (sometimes referred to as the first power supply 112) and the non-inverting input of the first differential amplifier U1 (sometimes referred to as the first differential amplifier 140). A resistor R5 is connected between the non-inverting input to the first differential amplifier U1 and VREF. A capacitor C1 is connected between the non-inverting input to the first differential amplifier U1 and ground. The capacitor C1 serves to suppress noise and transients so that they do not influence the output of the first differential amplifier U1. The value of the capacitor C1 has been chosen so as to suppress transients and to keep the power supply circuit 116 from turning off due to noise.

By connecting the non-inverting input of the first differential amplifier U1 to VREF through the resistor R5, the non-inverting input of the first differential amplifier U1 will never go to zero volts. For example, if the first power supply PS1 fails or otherwise has its output drop to zero volts, the non-inverting input of the first differential amplifier U1 will still remain above zero volts. In the embodiment described herein, the non-inverting input of the first differential amplifier U1 will drop to approximately 0.0046 volts when the output 120 of the first power supply PS1 drops to zero volts. This bias on the non-inverting input of the first differential amplifier U1 serves to prevent the power supply circuit 116 from oscillating. It has been found that if the non-inverting input of the first differential amplifier U1 is connected to ground through the resistor R5, the system may possibly become unstable because the circuit is a closed loop. This instability may cause the first voltage comparator U2 (sometimes referred to as the first voltage comparator 150) to oscillate, which in turn causes the gate voltage on the first mosfet Q1 to oscillate. Accordingly, the first mosfet Q1 turns off and on at the frequency of the gate voltage oscillation.

The voltage VREF was applied to the resistor R5 because it is a convenient voltage within the power supply circuit 100. It should be understood, however, that voltage values other than VREF may be applied to the resistor R5 as long as the same voltage is applied to the second voltage comparator U2.

The first differential amplifier U1 is configured to be single sided. The positive power input is connected to a twelve volt supply and the negative power input is connected to ground. Accordingly, when the first differential amplifier U1 goes into positive saturation, it will output approximately 10.5 volts. Likewise, when the first differential amplifier U1 goes into negative saturation, it will output approximately zero volts. A capacitor C2 is used to suppress noise on the twelve volt power supply line in a conventional manner.

A feedback resistor R6 and a feedback capacitor C3 are connected between the inverting input and the output of the first differential amplifier U1. The drain of the first mosfet Q1 is also connected to the inverting input of the first differential amplifier U1 by way of a resistor R7. The gain associated with the first differential amplifier U1 relative to the source to drain voltage of the first mosfet Q1 is approximately proportional to the value of the resistor R6 divided by the value of the resistor R7. In the non-limiting embodiment described herein, the gain is approximately one hundred. The gain associated with the first differential amplifier U1 has been selected so that under maximum output current conditions of the first power supply PS1, the first differential amplifier U1 outputs approximately eight volts. More specifically, when the first power supply PS1 outputs twenty amperes through the on resistance of the first mosfet Q1 of 0.004 ohms, the gain of one hundred cause the first differential amplifier U1 to output eight volts plus VREF. It should be noted that the capacitor C3 serves as a low pass filter to suppress high frequency noise or other variations from being amplified and output by the first differential amplifier U1. The value of the capacitor C3 has been selected to prevent the first monitoring circuit 116 from turning off due to noise in the system.

The output of the first differential amplifier U1 is connected to the non-inverting input of the first voltage comparator U2 through a resistor R8. A feedback resistor R9 is connected between the non-inverting input of the first voltage comparator U2 and the output of the first voltage comparator U2. In the non-limiting embodiment of the power supply circuit 100, the combination of R8 and R9 serve to provide hysteresis for the turn on and turn off voltages of the first mosfet 124. Accordingly, the first mosfet 124 will not oscillate as the first mosfet 124 is turning on or off. The inverting input of the first voltage comparator U2 is biased at the voltage VREF. The first voltage comparator U2 will not turn on the first mosfet Q1 until a voltage applied by the first differential amplifier U1 that is only slightly greater than the voltage VREF. Like the first differential amplifier U1, the first voltage comparator U2 is single sided with its positive power input connected to the twelve volt power supply and its negative power input connected to ground. A capacitor C4 serves to suppress noise on the twelve-volt supply as described with reference to the first differential amplifier U1.

The output of the first voltage comparator U2 is connected to the gate of the first mosfet Q1. By causing the output of the first voltage comparator U2 to go into either positive or negative saturation, the first mosfet Q1 is turned either on or off. The gate of the first mosfet Q1 is also connected to a zener diode D2 and the twelve volt supply by way of a pull up resistor R10. The pull up resistor R10 is required because the output of the first voltage comparator U2 is an open collector. The zener diode D2 prevents the voltage on the gate of the first mosfet Q1 from exceeding twelve volts.

The components and the arrangement of components of the second monitoring circuit 118 are identical to the first monitoring circuit 116 and therefore will not be described in detail.

Having described the components of the first monitoring circuit 116, the operation of the power supply circuit 100 will now be described. Several operating conditions of the power supply circuit 100 will be described with both the first power supply PS1 and the second power supply PS2 in active and inactive modes.

The power supply circuit 100 commences operation with both the first power supply 112 and the electronic components 110 off or otherwise inactive. Likewise, the power supply circuit 100 commences operation with the voltage VREF at zero volts. With reference to the first power supply 112 and the first monitoring circuit 116, zero volts are present at the inverting input of the first differential amplifier 140. When the twelve volt power supply starts to power up, a voltage approximately equal to VREF becomes present at the non-inverting inputs of the first differential amplifier U1 and the second differential amplifier U4. More specifically, a voltage equal to (101VREF(1 k/(1 k+100k))) is present on the non-inverting inputs of the first differential amplifier U1 and the second differential amplifier U4. Accordingly, the non-inverting inputs are at a higher voltage than the inverting inputs. The voltages at the inputs to the first differential amplifier U1 and the second differential amplifier U4 cause them to output voltages greater than VREF to the first voltage comparator U2 and the second voltage comparator U3 respectively. The first voltage comparator U2 and the second voltage comparator U3 output voltages which will turn on the first mosfet Q1 and the second mosfet Q2 respectively. It should be noted that the above-described process will only occur of the offset voltage on the non-inverting input to the first differential amplifier U1 is greater than zero volts. If the offset voltage is less than zero volts, the first mosfet Q1 will not turn on until a voltage starts to appear on the output of the first power supply PS1. The twelve volt power supply may power both the first power supply PS1 and the second power supply PS2. Therefore, as the twelve volt power supply turns on, the first power supply PS1 and the second power supply PS2 will turn on. They, however, may not turn on at the same time. For example internal characteristics may cause the first power supply PS1 to turn on before the second power supply PS2. When this happens, the corresponding mosfet, which is the second mosfet Q2 in this example, turns off and isolates the power supply. When the second power supply PS2 turns on, the second mosfet Q2 will also turn on so that the second power supply PS2 becomes electrically connected to the electronic components 110.

Having described the power up process of the power supply circuit 100, the operation of the power supply circuit 100 with both the first power supply PS1 and the second power supply PS2 operating will now be described.

In the following operating condition, it is assumed that both the first power supply PS1 and the second power supply PS2 are active and both the first mosfet Q1 and the second mosfet Q2 are on. It is also assumed that the electronic components 110 are drawing high current, e.g., twenty amperes. Thus, the line 130 has a voltage of approximately 3.3 volts. In one embodiment, remote sensing of the power supplies assures that the 3.3 volts are present on the line 130. The voltage at the source of the first mosfet Q1 will be approximately equal to ten amperes multiplied by the on resistance of 0.004 ohms plus 3.3 volts. Accordingly, the voltage at the source of the first mosfet 124 is slightly higher than the voltage at the drain.

The first differential amplifier U1 and its associated components amplify the voltage $V_{SD}$ for a gain of approximately one hundred. Because the voltage at the drain of the first mosfet Q1 is slightly less than the voltage at the source of the first mosfet Q1, the first differential amplifier U1 outputs a positive voltage. The gain associated with the first differential amplifier U1 causes it to output a relatively high voltage upon a relatively small source to drain voltage $V_{SD}$ on the first mosfet 124. The output of the first differential amplifier U1 is approximately equal to the current flow through the first mosfet Q1 times the on resistance of the first mosfet Q1 times the gain associated with the first differential amplifier U1 plus VREF. The output of the first differential amplifier U1 is connected to the non-inverting input of the first voltage comparator U2. The first voltage comparator U2 turns on its internal transistor when the output of the first differential amplifier U1 is slightly greater than VREF. This causes the output voltage of the first voltage comparator U2 to be approximately twelve volts. The output voltage is regulated by the zener diode D2 and is maintained by the pull up resistor R10. The output voltage is applied to the gate of the first mosfet Q1, which causes the first mosfet Q1 to remain on.

Having describe the power supply circuit 100 with the first power supply PS1 and the second power supply PS2 active, the power supply circuit 100 will now be described with the first power supply PS1 inactive and the second power supply PS2 active. Such a situation may occur if the first power supply PS1 is deactivated prior to the second power supply PS2 being deactivated. Such a situation may also occur if the first power supply PS1 fails.

When the first power supply PS1 is inactive, the output 120 will become a virtual short circuit and will sink current. In this situation, the drain of the first mosfet Q1 is at a higher voltage than the source. The first differential amplifier U1 will then saturate in the negative, causing it to output zero volts. The output of the first differential amplifier is less than VREF, so the first voltage comparator U2 also saturates in the negative, causing zero volts to be applied to the gate of the first mosfet Q1. Accordingly, the first mosfet Q1 turns off. When the first mosfet Q1 turns off, the intrinsic body diode of the first mosfet Q1 serves to isolate the first power supply PS1 from the other components of the power supply circuit 100. Accordingly, the first power supply PS1 cannot draw current from the line 130 and will not affect the voltage on the line 130 or draw power from the electronic components 110. It should be noted that when the first power supply PS1 becomes isolated from the electronic components 110, the second power supply PS2 continues to supply power to the electronic components 110. Therefore, the electronic components 110 continue to operate without disruption.

Another mode of operation of the power supply circuit 100 occurs when the electronic components 110 or other components connected thereto short or otherwise draw excessive current. In this situation, the source of the first mosfet Q1 remains at a higher voltage than the drain, therefore, the first mosfet Q1 remains on. The intrinsic body diode of the first mosfet Q1, however, is bypassed and the excessive current flows through the body of the first mosfet Q1. Due to the very low resistance between the source and the drain of the first mosfet Q1 when it is on, very little energy is expended within the first mosfet Q1, which prevents it from overheating or otherwise becoming damaged. Accordingly, very few measures are required to be taken to convect heat from the first mosfet 124.

It should be noted that the first voltage comparator U2 and the second voltage comparator U3 may have hysteresis. This prevents them from oscillating as the outputs of the first differential amplifier U1 and the second differential amplifier U4 pass through their threshold voltages.

Having described some non-limiting embodiments of the power supply circuit 100, other embodiments of the power supply circuit 100 will now be described.

The first mosfet Q1 and the second mosfet Q2 have been described herein as being power mosfets. It should be understood that other switching devices may be used in place of the power mosfets. For example, analog switches may be used. In another example, a relay having a loss across its contacts may be used in place of the mosfets. In some situations, a device, such as a capacitor, may have to be used in parallel with the electronic components to prevent the voltage at the electronic components from dropping upon the deactivation of one power supply.

The first differential amplifier U1 and the second differential amplifier U4 have been described herein as being measuring devices. It should be noted that other devices may measure the voltage drops across the mosfets or other switching devices. It should also be noted that the measuring devices may be operatively connected to the switching devices. For example, the outputs of the measuring devices may be operatively connected to the gates of the mosfets. In yet another embodiment, both the first differential amplifier U1 and the first voltage comparator U2 may be a single device.

The first power supply PS1 and the second power supply PS2 may each provide enough power to supply the electronic components 110. Therefore, the failure of one power supply will cause it to be isolated from the other power supply and it will not drain power from the remaining power supply.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A power supply system comprising:
a first power supply having a first power supply output;
a second power supply having a second power supply output;
a first switching device comprising a first switching device input, a first switching device output, and a first switching device control; said first switching device input being electrically connected to said first power supply output; said first switching device output being operatively connected to said second power supply output;
a first voltage measuring device operatively connected between said first switching device input and said first switching device output, said first voltage measuring device having a first voltage measuring device output, said first voltage measuring device being adapted to output a signal on said first voltage measuring device output that is representative of the difference between the voltage at said first switching device input and said first switching device output; and
a voltage comparator having a comparator first input, a comparator second input, and a comparator output, said comparator first input being operatively connected to said first voltage measuring device output, said comparator second input being operatively connected to a preselected voltage level, and said comparator output being operatively connected to said switching device control.

2. The system of claim 1, wherein said first switching device is a first mosfet.

3. The system of claim 1, wherein said first voltage measuring device is a differential amplifier operatively connected between said first switching device input and said first switching device output.

4. The system of claim 3 and further comprising a low-pass filter operatively connected in the feedback of said differential amplifier.

5. The system of claim 3, wherein said differential amplifier has an inverting input and a non-inverting input, said non-inverting input being connected to said first switching device input through a first resistor, said non-inverting input being connected to a preselected voltage by way of a second resistor.

6. The system of claim 5, wherein said first resistor has a value of approximately 1 k ohms, said second resistor has a value of approximately 100 k ohms, and said preselected voltage has a value of approximately 0.586 volts.

7. The system of claim 1 and further comprising:
a second switching device comprising a second switching device input, a second switching device output, and a second switching device control; said second switching device input being connected to said second power supply output; said second switching device output being operatively connected to said first switching device output; and
a second voltage measuring device operatively connected between said second switching device input and said second switching device output, said second voltage measuring device having a second voltage measuring device output, said second voltage measuring device being adapted to output a signal on said second voltage measuring device output that is representative of the difference between the voltage at said second switching device input and said second switching device output; said second voltage measuring device output being operatively connected to said second switching device control.

8. The system of claim 1 and further comprising a low-pass filter operatively associated with said first voltage measuring device so as to filter high frequency components of the voltage at said first switching device output.

9. A power supply system comprising:
a first power supply having a first power supply output;
a second power supply having second power supply output;
a first mosfet, wherein the source of said first mosfet is operatively connected to said first power supply output, wherein the drain of said first mosfet is operatively connected to said second power supply output;
a first voltage measuring device operatively connected between said source and said drain of said first mosfet, said first voltage measuring device having a measuring device output adapted to generate a signal representative of the voltage difference between said source and said drain of said first mosfet; and
a first voltage comparator comprising a comparator first input, a comparator second input, and a comparator output, said comparator first input being operatively connected to said measuring device output, said comparator second input being operatively connected to a preselected voltage, said comparator output being operatively connected to the gate of said first mosfet.

10. The system of claim 9, wherein said first voltage comparator is adapted to output a preselected voltage if said signal generated by said first voltage measuring device is representative of a voltage difference between said source and said drain of said first mosfet that is greater than said preselected voltage.

11. The system of claim 9, wherein s aid first voltage measuring device is a differential amplifier.

12. The system of claim 9, wherein said first voltage measuring device is an operational amplifier.

13. The system of claim 12, wherein the non-inverting input of said operational amplifier is operatively connected to said first power supply output and the inverting input of said operational amplifier is operatively connected to the output of said power system.

14. The system of claim 12, wherein a preselected voltage is operatively connected to said non-inverting input of said operational amplifier through a resistor, said preselected voltage being less than the maximum voltage output of said first power supply.

15. The system of claim 12, wherein said operational amplifier has a gain of approximately one-hundred associated therewith.

16. The system of claim 9 and further comprising:
a second mosfet, wherein the source of said second mosfet is operatively connected to said second power supply output, wherein the drain of said second mosfet is operatively connected to said drain of said first mosfet;
a second voltage measuring device operatively connected between said source and said drain of said second mosfet, said second voltage measuring device having a measuring device output adapted to generate a signal representative of the voltage difference between said source and said drain of said second mosfet; and
a second voltage comparator comprising a second comparator input and a second comparator output, said second comparator input being operatively connected to said measuring device output, said second comparator output being operatively connected to the gate of said second mosfet.

17. The system of claim 9 and further comprising a low-pass filter operatively associated with said voltage measuring device.

18. A method for isolating a first power supply from a second power supply, said first power supply having a first power supply output and said second power supply having a second power supply output, said method comprising:

provide a first switching device, said first switching device having a first switching device input, a first switching device output, and a first switching device control;

operatively connecting said first switching device input to said first power supply output;

operatively connecting said first switching device output to said second power supply output;

measuring the voltage difference between said first switching device input and said first switching device output;

comparing said voltage difference to a preselected voltage;

conducting current through said first switching device when said voltage difference is greater than said preselected voltage; and interrupting the current flow through said first switching device when said voltage difference is not greater than said preselected voltage.

19. The method of claim 18, wherein said providing a first switching device comprises providing a mosfet, said first switching device control being the gate of said mosfet.

20. The method of claim 18, wherein said measuring comprises measuring the polarity of said first switching device input relative to said first switching device output; wherein said conducting comprises conducting current through said first switching device when a first polarity is present between said switching device input and said switching device output; and wherein said interrupting comprises interrupting the current flow through said first switching device when a second polarity is present between said switching device input and said switching device output.

21. The method of claim 18 and further comprising:

providing a second switching device, said second switching device having a second switching device input, a second switching device output, and a second switching device control;

operatively connecting said second switching device input to said second power supply output;

operatively connecting said second switching device output to said first switching device output;

measuring the voltage difference between said second switching device input and said second switching device output;

comparing said voltage difference to a preselected voltage;

conducting current through said second switching device when said voltage difference is greater than said preselected voltage; and interrupting the current flow through said second switching device when said voltage is not greater than said preselected voltage.

22. The method of claim 21, wherein said providing a second switching device comprises providing a second mosfet, said second switching device control being the gate of said second mosfet.

23. The method of claim 18 and further comprising filtering out high frequency components of the voltage measured at said first switching device output.

24. A means for electrically connecting a first power supply to a second power supply, said means comprising:

means for controlling current comprising an input, an output, and a control, said input being operatively connected to an output of said first power supply, said output being operatively connected to an output of said second power supply;

means for measuring the voltage drop between said input and said output of said means for controlling current, said means for measuring comprising an output adapted to output a signal representative of said voltage drop; and means for comparing said output to a preselected value, said means for comparing comprising an output that is operatively connected to said control of said means for controlling current.

* * * * *